United States Patent
Costello et al.

(10) Patent No.: US 10,903,871 B2
(45) Date of Patent: Jan. 26, 2021

(54) METHOD OF IMPROVED CYBER SECURITY WITH FREQUENCY SEPARATION

(71) Applicants: Rolls-Royce Corporation, Indianapolis, IN (US); Rolls-Royce North American Technologies Inc., Indianapolis, IN (US)

(72) Inventors: John Joseph Costello, Indianapolis, IN (US); Richard Joseph Skertic, Carmel, IN (US)

(73) Assignees: ROLLS-ROYCE CORPORATION, Indianapolis, IN (US); ROLLS-ROYCE NORTH AMERICAN TECHNOLOGIES INC., Indianapolis, IN (US)

( * ) Notice: Subject to any disclaimer, the term of this patent is extended or adjusted under 35 U.S.C. 154(b) by 166 days.

(21) Appl. No.: 16/057,546

(22) Filed: Aug. 7, 2018

(65) Prior Publication Data

US 2020/0052735 A1 Feb. 13, 2020

(51) Int. Cl.
*H04L 29/06* (2006.01)
*H04B 1/7136* (2011.01)
(Continued)

(52) U.S. Cl.
CPC ......... *H04B 1/7136* (2013.01); *G06F 21/554* (2013.01); *H04B 1/7143* (2013.01);
(Continued)

(58) Field of Classification Search
None
See application file for complete search history.

(56) References Cited

U.S. PATENT DOCUMENTS

2002/0039904 A1* 4/2002 Anderson ............. H04W 64/00
455/456.1
2002/0157102 A1* 10/2002 Lee ..................... H04N 7/17336
725/93
(Continued)

FOREIGN PATENT DOCUMENTS

EP 3 435 569 A1 1/2019

OTHER PUBLICATIONS

Extended European Search Report, issued in EP Application No. 19184891.0, dated Dec. 6, 2019, pp. 1-6, European Patent Office, Munich, Germany.
(Continued)

*Primary Examiner* — William J. Goodchild
(74) *Attorney, Agent, or Firm* — Brinks Gilson & Lione

(57) ABSTRACT

Control systems and methods to secure communications within the control system. The control system includes a control node operably coupled to a concentrator node via a first data link. The control node can communicate with the concentrator node over the first data link at a first communication frequency and first communication rate. The control node can also change the first communication frequency in response to an event, such as a cyber-security threat. The concentrator node can communicate with the control node at the changed first communication frequency in response to receiving a frequency change indication. In some examples, the control node is also operably coupled to the concentrator node via a second data link. The second data link may operate at a second communication rate that is different from the first communication rate. The control node may send redundant data on the first data link and the second data link.

18 Claims, 5 Drawing Sheets

(51) Int. Cl.
*G06F 21/55* (2013.01)
*H04B 1/7143* (2011.01)
*H04W 12/02* (2009.01)
*H04W 12/08* (2009.01)

(52) U.S. Cl.
CPC ......... *H04L 63/0281* (2013.01); *H04W 12/02* (2013.01); *H04W 12/08* (2013.01)

(56) References Cited

U.S. PATENT DOCUMENTS

| | | | |
|---|---|---|---|
| 2003/0127569 A1* | 7/2003 | Bacon | B64C 13/505 244/195 |
| 2005/0249236 A1* | 11/2005 | Walden | H04L 9/3231 370/465 |
| 2006/0095199 A1* | 5/2006 | Lagassey | B62D 41/00 701/117 |
| 2014/0303832 A1* | 10/2014 | Skertic | B64D 45/00 701/29.6 |
| 2015/0363981 A1* | 12/2015 | Ziarno | G07C 5/0841 701/101 |
| 2016/0065603 A1 | 3/2016 | Dekel | |
| 2019/0036638 A1 | 1/2019 | Skertic | |

OTHER PUBLICATIONS

European Search Report, dated Dec. 6, 2019, in EP Application No. 19184891.0.

* cited by examiner

METHOD OF IMPROVED CYBER SECURITY WITH FREQUENCY SEPARATION

CROSS-REFERENCE TO RELATED APPLICATIONS

This application is related to concurrently filed U.S. patent application Ser. No. 16/057,554, entitled "A Method and Process of Cyber Security via Software Imaging," filed Aug. 7, 2018, inventors: John Joseph Costello and Richard J. Skertic; U.S. patent application Ser. No. 16/057,526, entitled "Distributed Control and Monitoring System for Multiple Platforms," filed Aug. 7, 2018, inventors: Nathan Bingham, Michael T. Elliott, James McPherson, Chris Ruff, Andrew Terbrock and Kerry Wiegand; U.S. patent application Ser. No. 16/057,529, entitled "Distributed Control and Monitoring System for Multiple Platforms," filed Aug. 7, 2018, inventors: Nathan Bingham, Michael T. Elliott, James McPherson, Chris Ruff, Andrew Terbrock and Kerry Wiegand; U.S. patent application Ser. No. 16/057,535, entitled "Distributed Control and Monitoring System for Multiple Platforms," filed Aug. 7, 2018, inventors: Nathan Bingham, Michael T. Elliott, James McPherson, Chris Ruff, Andrew Terbrock and Kerry Wiegand; and U.S. patent application Ser. No. 16/057,542, entitled "Distributed Control and Monitoring System for Multiple Platforms," filed Aug. 7, 2018, inventors: Nathan Bingham, Michael T. Elliott, James McPherson, Chris Ruff, Andrew Terbrock and Kerry Wiegand. The entirety of these applications are herein incorporated by reference.

BACKGROUND

Aircrafts, such as commercial and military aircraft, include aerospace control systems that control and monitor aircraft engines. The aerospace control systems may control and/or monitor aerospace control system components such as, for example, aircraft engine pressure sensors, temperature sensors, solenoids, and actuators. The aerospace control systems may also control and/or manage other aircraft engine parts and/or functionality. For example, aerospace control systems may assist in ensuring optimum aircraft engine efficiencies during flight are achieved by receiving various flight condition information and controlling various aircraft engine operations, such as fuel flow, valve positions, and others. Aerospace control systems may include a full authority digital engine controller ("FADEC") that includes an electronic engine controller ("EEC") or engine control unit ("ECU"). The FADEC may further include a central processing unit ("CPU"), memory, and a data bus to communicate with other aircraft engine components, such as aircraft engine sensors and actuators. In addition, the FADEC may include maintenance ports and/or communication ports. These ports include connector interfaces for various connector types such as Ethernet ports, serial ports, and/or universal serial bus ("USB") ports, among others, that may connect with different parts of the aircraft.

Aerospace control systems may include a centralized (or federated) control system ("CCS") architecture design or a distributed control system ("DCS") architecture design. Aerospace control systems incorporating a CCS architecture design include a FADEC with a CPU that handles all processing functions. The FADEC also includes additional electronic circuitry required for data acquisition (such as from the various sensors) as well as signal conditioning. In addition, interface (e.g., wire) harnesses may be used to connect the various aerospace control system components, such as sensors and/or actuators to the FADEC.

An aerospace control system incorporating a DCS architecture design, however, may not require a FADEC with this additional circuitry. Instead, the various aerospace control system components (e.g., sensors and/or actuators) include local processing capabilities that can relay information to the FADEC's CPU. In addition, a DCS architecture design includes digital communication between the FADEC and the various sensors and/or actuators, rather than interface harnesses. Aerospace control systems with a DCS architecture design may also employ a data concentrator (e.g., concentrator node) that provides for communication with both components that do not include local processing capabilities as well as components that do include local processing capabilities. The data concentrator facilitates the communications between the FADEC and the nodes.

These aerospace architectures, however, have vulnerabilities during operation in a cyber-hostile environment. For example, threats from a cyber attack can come from software loaded onto the FADEC via one of the FADEC's maintenance or communication ports, for example. Threats may also come from hacking into access points over communication links between the FADEC and other parts of the aerospace control system, such as sensors and actuators. In addition, aerospace architectures are vulnerable to "hardware hacks," where hardware, such as the FADEC or a communication link, is physically altered to allow access to the aerospace control system. As such, there are opportunities to address these and other vulnerabilities with aerospace control systems.

SUMMARY

According to some aspects of the present disclosure, a control system for an aircraft engine includes a first data link, a second data link, a control node with a processor, and a concentrator node with a second processor. The concentrator node is operably coupled to the control node via the first data link and via the second data link. The control node is operable to communicate with the concentrator node over the first data link at a first communication frequency and a first communication rate, and may change the first communication frequency in response to at least one event.

In some examples, an aircraft includes a first data link, a second data link, an aircraft engine, and an aircraft engine control system operably coupled to the aircraft engine. The aircraft engine control system includes a control node with a processor, and a concentrator node with a processor. The concentrator node is operably coupled to the control node via the first data link and via the second data link, and is configured to communicate with the concentrator node over the first data link at a first communication frequency at a first communication rate. The concentrator node may also be configured to communicate with the concentrator node over the second data link at a second communication rate that is different than the first communication rate. The control node may be configured to detect a cyber security threat and change the first communication frequency in response to detecting the cyber security threat.

In some examples, a method for controlling an aircraft engine includes communicating, by a processor of a control node, with a processor of a concentrator node over a first data link at a first communication frequency at a first communication rate. The method may include communicating, by the first processor of the control node, with the second processor of the concentrator node over a second data link at a second communication rate that is different than the first communication rate. The method may also include detecting, by the first processor of the control node, a communication anomaly over the first data link, and changing, by the first processor of the control node, the first communication frequency in response to the detected communication anomaly. The method may further include communicating, by the first processor of the control node, with the second processor of the concentrator node over the first data link at the changed first communication frequency.

In some examples, a non-transitory computer readable medium includes instructions that, when executed by one or more processors of a control node, cause the one or more processors of the control node to communicate with one or more processors of a concentrator node over a first data link at a first communication frequency at a first communication rate. The instructions, when executed by the one or more processors of the control node, may also cause the one or more processors of the control node to communicate with the one or more processors of the concentrator node over a second data link at a second communication rate that is different than the first communication rate. The instructions, when executed by the one or more processors of the control node, may also cause the one or more processors of the control node to detect a communication anomaly over the first data link, and to change the first communication frequency in response to the detected communication anomaly. The instructions, when executed by the one or more processors of the control node, may also cause the one or more processors of the control node communicate with the second processor of the concentrator node over the first data link at the changed first communication frequency.

BRIEF DESCRIPTION OF THE DRAWINGS

The following will be apparent from elements of the figures, which are provided for illustrative purposes.

Figure 1:
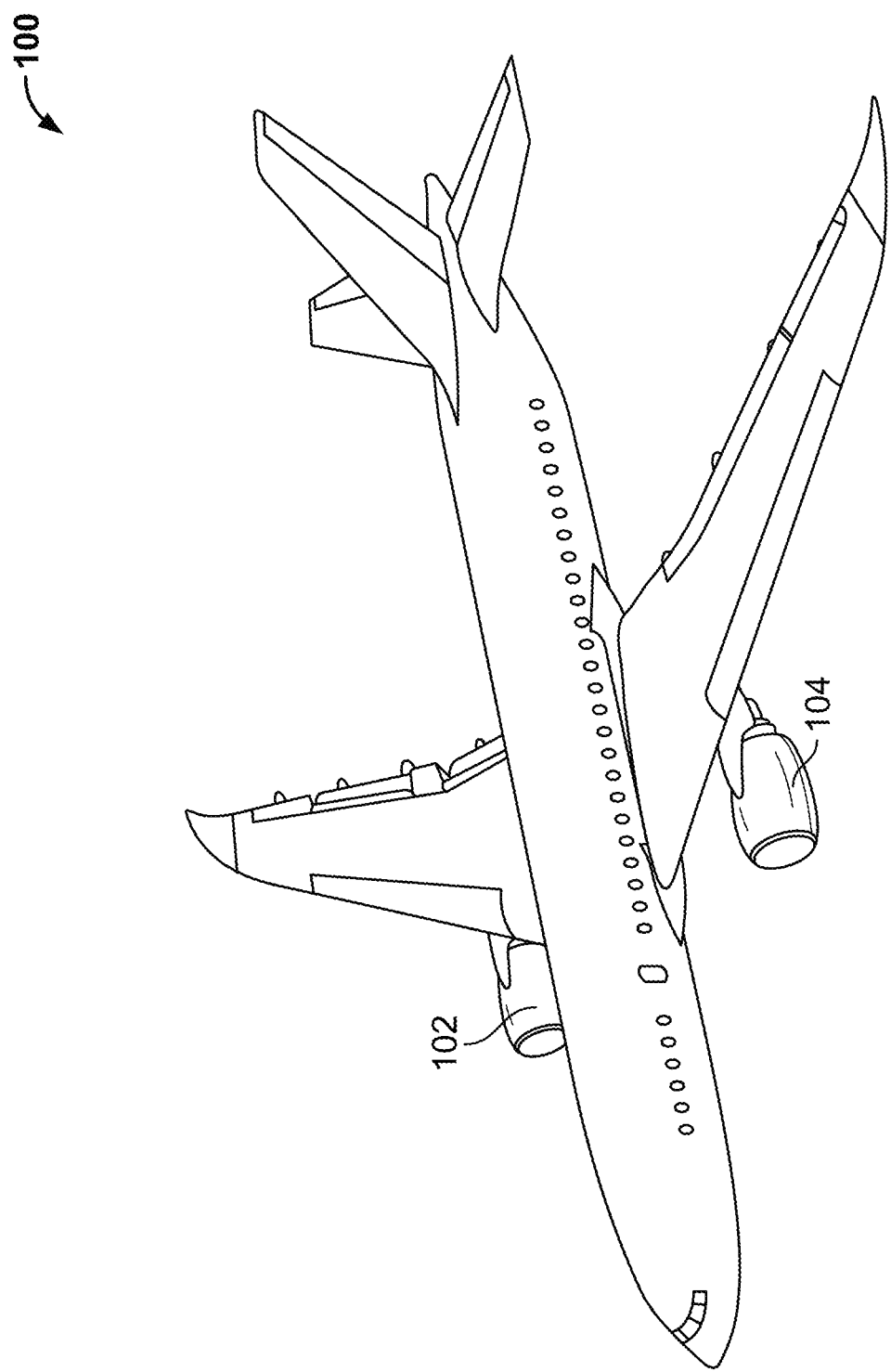
FIG. 1 is an illustration of an aircraft with engines employing an engine control system in accordance with some embodiments.

While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the disclosure as defined by the appended claims.

DETAILED DESCRIPTION

For the purposes of promoting an understanding of the principles of the disclosure, reference will now be made to a number of illustrative embodiments in the drawings and specific language will be used to describe the same.

FIG. 1 illustrates an example aircraft 100 with turbine engines 102, 104. Each turbine engine may be controlled by an engine control system, which is discussed in more detail with respect to FIG. 2.

Figure 2:
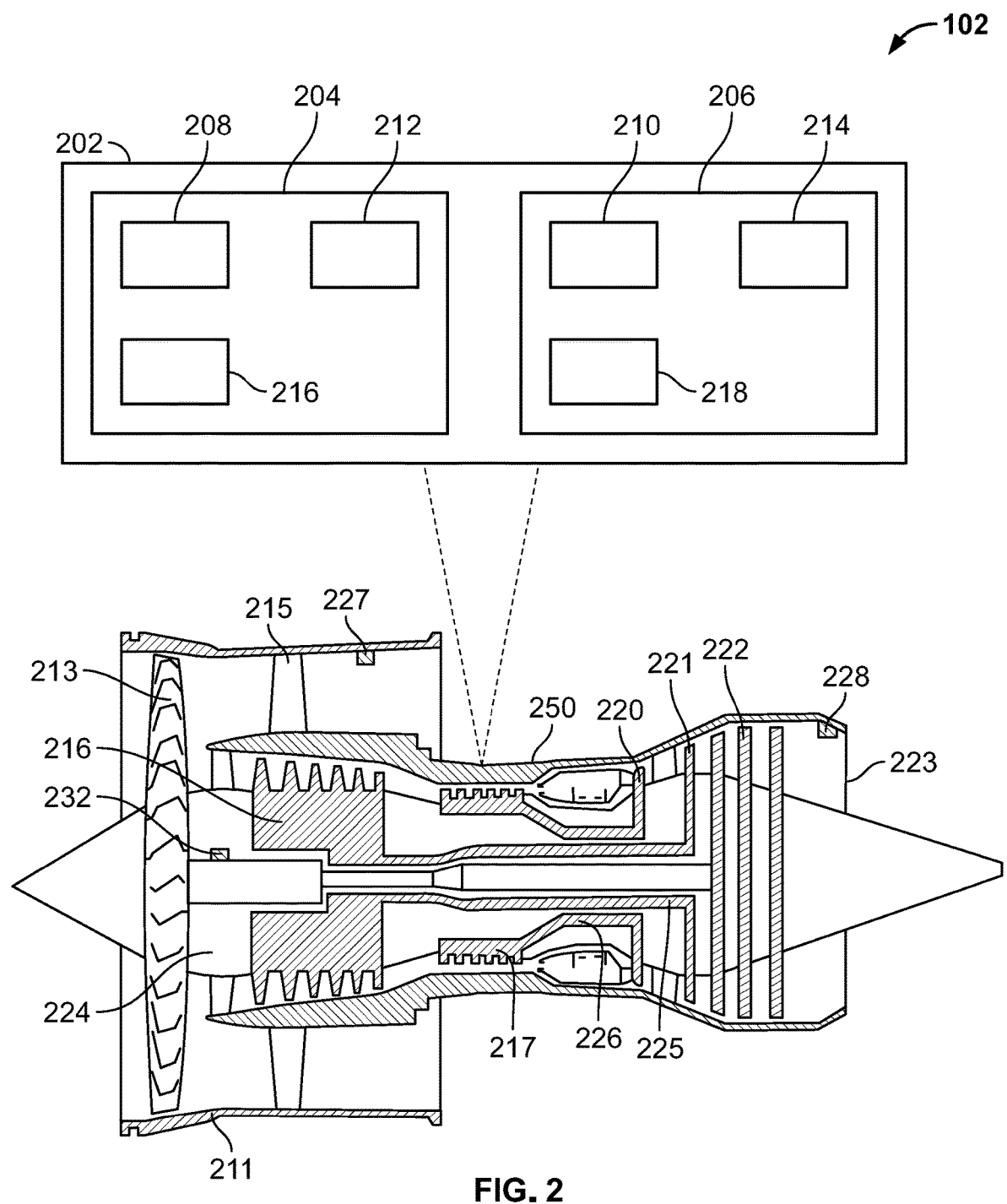
FIG. 2 is an illustration of an aircraft engine employing an engine control system in accordance with some embodiments.

FIG. 2 illustrates the aircraft engine 102 of the example aircraft 100 of FIG. 1 in more detail. The aircraft engine 102 includes an engine control system 202 that includes a control node 204 and a concentrator node 206. The control node may be, for example, a FADEC. Each of the control node 204 and concentrator node 206 includes electronic circuitry. The electronic circuitry may include one or more processing units 208, 210. A processing unit can be, for example, a microprocessor, an execution unit or "core" on a microprocessor chip, a digital signal processor (DSP), a soft or hard core within a field-programmable gate arrays (FPGA), a processor within an application-specific integrated circuit (ASIC), a general processing unit (GPU), a commercial off the shelf (COTS) processor, or any other suitable processor.

Each of the control node 204 and concentrator node 206 may include instruction memory 212, 214, respectively. Instruction memory 212, 214 can store instructions that can be accessed (e.g., read) and executed by processing units 208, 210, respectively. For example, each of instruction memory 212, 214 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Each of the control node 204 and concentrator node 206 may also include working memory 216, 218, respectively. Processing units 208, 210 can store data to, and read data from, working memory 216, 218, respectively. For example, processing units 208, 210 can store a working set of instructions to working memory 216, 218, such as instructions loaded from instruction memory 212, 214, respectively. Processing units 208, 210 can also use working memory 208, 210, respectively, to store dynamic data.

FIG. 2 further illustrates, as part of aircraft engine 102, a fan 213, a first compressor 216, a second compressor 217, turbines 220, 221, 222, propulsion nozzle 223, and fan duct 211. The fan duct 211 is supported by guide vanes 215 extending from engine platform 250. The fan 213 is driven by a first shaft 224 connected to fan 213. First compressor 216 is driven by turbine 221 via a second shaft 225, and second compressor 217 is driven by turbine 220 via a third shaft 226. Engine control system 202 may also be communicatively coupled to one or more engine control devices 227, 228, 232 such as sensors (e.g., pressure or speed transducer) or actuators.

Figure 3:
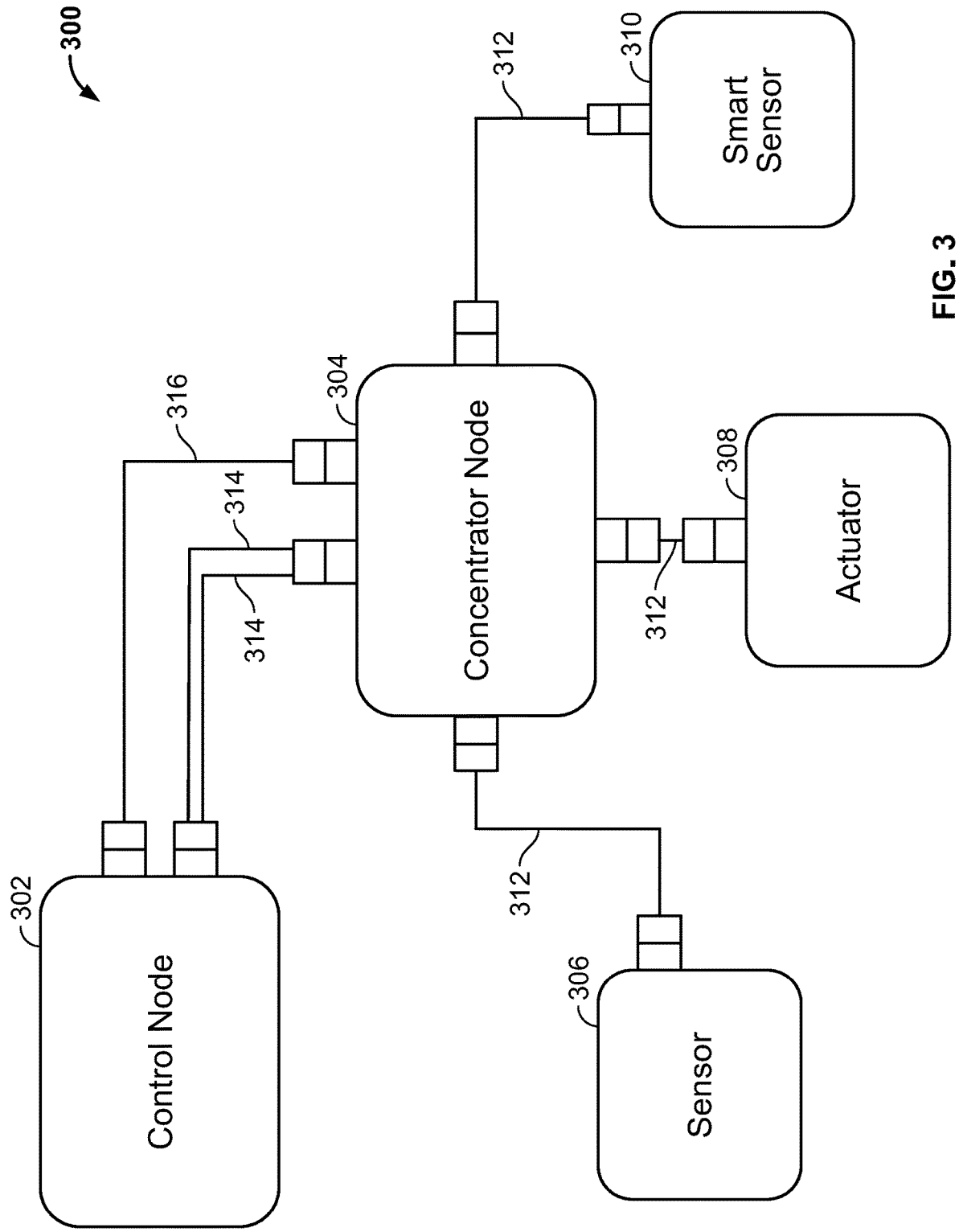
FIG. 3 is a block diagram of an engine control system in accordance with some embodiments.

FIG. 3 illustrates a block diagram of an engine control system 300 that includes a control node 302, a concentrator node 304, one or more sensors 306, one or more actuators 308, and one or more smart sensors 310. Concentrator node 304 is communicatively coupled to each of one or more sensors 306, one or more actuators 308, and one or more smart sensors 310 over communication link 312. For example, concentrator node 304 may communicate with each of one or more sensors 306, one or more actuators 308, and one or more smart sensors 310 over communication link 312, which may be a fiber optic communication link, an Ethernet link, or any other suitable link. Communication link 312 may employ, for example, an interconnect bus architecture. Communication between the control node 302 and the sensor 306, 310 and the actuator 308 in the embodiment shown in FIG. 3 is via the concentrator node.

Sensor 306 may be, for example, an optical sensor, a pressure sensor, a temperature sensor, or any other suitable sensor. Sensor 306 may provide sensor readings over communication link 312 to concentrator node 306. Smart sensor 310 may be a sensor that also provides processing capability. For example, rather than merely providing raw sensor readings, smart sensor 310 may provide calibrated readings over communication link 312 and/or may bypass the concentrator node 304 and communicate with the control node 302 using the same methodology as employed by the concentrator node 304. In some examples, concentrator node 306 includes drivers that can connect via a direct link (or over a bus architecture), such as an optical or electrical harness, to one or more actuators 308.

Concentrator node 304 is also communicatively coupled to control node 302 over at least a first communication link 314. The first communication link 314 may be fiber optic, Ethernet, hardwired and/or wireless. First communication link 314 may be a fiber optic link, such as one using multi-mode optical fiber (e.g., a multi-mode fiber optic link), for example. Control node 302 is operable to transmit to, and receive data from, concentrator node 304 over first communication link 314. For example, concentrator node 304 may send sensor readings, such as from one or more sensors 306 or one or more smart sensors 310, to control node 302 over first communication link 314. In addition, control node 302 may send control messages to concentrator node 304, such as control messages to control one or more actuators 308, over first communication link 314. In some examples, communications over first communication link 314 are encrypted.

Control node 302 and concentrator node 304 may establish a frequency within a supported frequency band to use for communications over the first communication link 314. For example, control node 302 and communication node 304 may begin communications at a default, or startup, frequency.

Control node 302 is operable to change the frequency used for communications over first communication link 304. In some examples, control node 302 changes the frequency when an event, such as an anomaly, has been detected. The event can be, for example, a disruption to communications, an unexpected increase in communication traffic, a particular communication traffic pattern, one or more sensor readings, a detected cyber security threat, a control system intrusion, a detection of malicious activity, or any other indication. In some examples, the event can be a change in light properties of the light travelling over the fiber optic link. For example, the event can be a change to one or more Stokes parameters based on the light travelling over the fiber optic link.

Control node 302 may detect the event, or may receive an indication of the detected event, such as from concentrator node 304. In some examples, upon detection or indication of the event, control node 302 may send a message to concentrator node 304 to change the communication frequency. For example, control node 302 may send a message indicating the frequency to be used (e.g. specifying the frequency or referencing a previously provided table/vector). The message may also indicate when the new frequency is to be used. For example, the message may indicate that the new frequency is to be used immediately, or that it is to be used beginning at a particular time. In some examples, the message indicates ranges of time in which a frequency is to be used.

In some examples, control node 302 and concentrator node 304 are configured to automatically change the frequency periodically. For example, control node 302 and concentrator node 304 may be configured to change the frequency after an amount of time (e.g., every 15 minutes, every hour, every day, etc.).

In some examples, control node 302 and concentrator node 304 maintain a same table of frequencies (vector) within a frequency band. Each table includes frequencies in a same order. Control node 302 may indicate to concentrator node 304 which frequency to use by identifying, in a message, an indicia (reference) associated with a frequency in the table. For example, the number "3" would indicate the third entry in the frequency table.

In some examples, control node 302 sends to concentrator node 304 a selection number I/O vector, which is a value that determines what frequency within a frequency band to communicate across. For example, the selection number I/O vector may include a listing of frequencies to communicate with. In other examples, the selection number I/O vector may include a listing of offsets within a frequency band. In some examples, control node 302 is configured to continue transmitting at a current frequency while also transmitting at a new frequency. For example, upon detection of an event, control node 302 may transmit data, such as "dummy data," at the current frequency which is ignored by concentrator node 304. Control node 302 may transmit valid data, which is not to be ignored, at a new frequency to concentrator node 304. Similarly, concentrator node 304 may transmit data that is to be ignored at a current frequency, while transmitting valid data at a new frequency.

In some examples, first communication link 314 includes multiple fiber optic links, such as in a braided ring. Each of the fiber optic links may be configured to operate over differing wavelength ranges. For example, one fiber optic link may operate in a range of wavelengths from 800 to 1500 nanometers, while a second fiber optic link may operate in a range of wavelengths from 300 to 500 nanometers. In some examples, control node 302 and concentrator node 304 are configured to send valid data over one fiber optic link, while sending "dummy data" on another fiber optic link. In some examples, control node 302 and concentrator node 304 are configured to change the link over which the valid data is sent over. For example, control node 302 and concentrator node 304 may change the link over which valid data is sent over automatically, periodically, or based on messaging (e.g., the control node 302 sends a message indicating such change to the concentrator node 304). In some examples, one fiber optic link operates over the ultraviolet (UV) parts of the frequency spectrum, while the other operates over the infrared (IR) parts of the frequency spectrum.

In some examples, concentrator node 304 is also communicatively coupled to control node 302 over a second communication link 316. Second communication link 316 may also be a fiber optic link, a hardwired link, such as an Ethernet link or wireless. In some examples, control node 302 is operable to transmit to, and receive data from, concentrator node 304 over second communication link 316. In some examples, communications over second communication link 316 are encrypted.

By having control node 302 and concentrator node 304 commutatively coupled over both first communication link 314 and second communication link 316, control node 302 and concentrator node 304 may communicate over different communication networks at different speeds. For example, where first communication link 314 is a fiber optic link, communication speeds may be in the range of 1 to 10 gigabits per second (GBps). In the example where second communication link 316 is an Ethernet link, communication speeds may be in the range of 10 to 100 megabits per second (MBps). As such, control node 302 and concentrator node 304 would be operable to communicate simultaneously over a fiber optic link at 10 GBps, and over an Ethernet link at 100 MBps.

In some examples, control node 302 can change the communication speed over any communication link, such as the first communication link 314 or the second communication link. For example, assuming that the first communication link 314 is a fiber optic link, control node 302 can send a message to concentrator node 304 to change the communication speed over the first communication link from 1 GBps to 10 GBps.

Control node 302 and concentrator node 304 may be configured to send redundant data over second communication link 316. The data may be redundant to the data sent over the first communication link 314. For example, control node 302 may send a same message to concentrator node 304 over both first communication link 314 and second communication link 316. Similarly, concentrator node 304 may send redundant information to control node 302 over both first communication link 314 and second communication link 316.

In some examples, concentrator node 304 verifies (e.g., checks) that the data received over first communication link 314 and second communication link 316 matches (e.g., is in fact redundant of each other). If the data verifies as redundant, concentrator node 304 takes appropriate action. For example, if the data indicates a request for sensor data, concentrator node 304 reads the appropriate sensor and sends the sensor readings to control node 302. Otherwise, if the data does not match (e.g., a data verification error), concentrator node 304 may take precautionary measures.

Precautionary measures may include, for example, concentrator node 304 ignoring the data (e.g., disregarding the data that failed verification). In some examples, concentrator node 304 may send a message to control node 304 that the data did not verify. Control node 302 may then give an indication of such failure, such as by causing an error light (e.g., led) to turn on, or by providing an error message to a user of the control system. In some examples, in response to detecting a data verification error, concentrator node 304 may message control node 302 that the frequency being used to communicate over first communication link 314 is to be changed. Control node 302 and concentrator node 304 may then begin communicating with each other over first communication link 314 at the new frequency.

Figure 4:
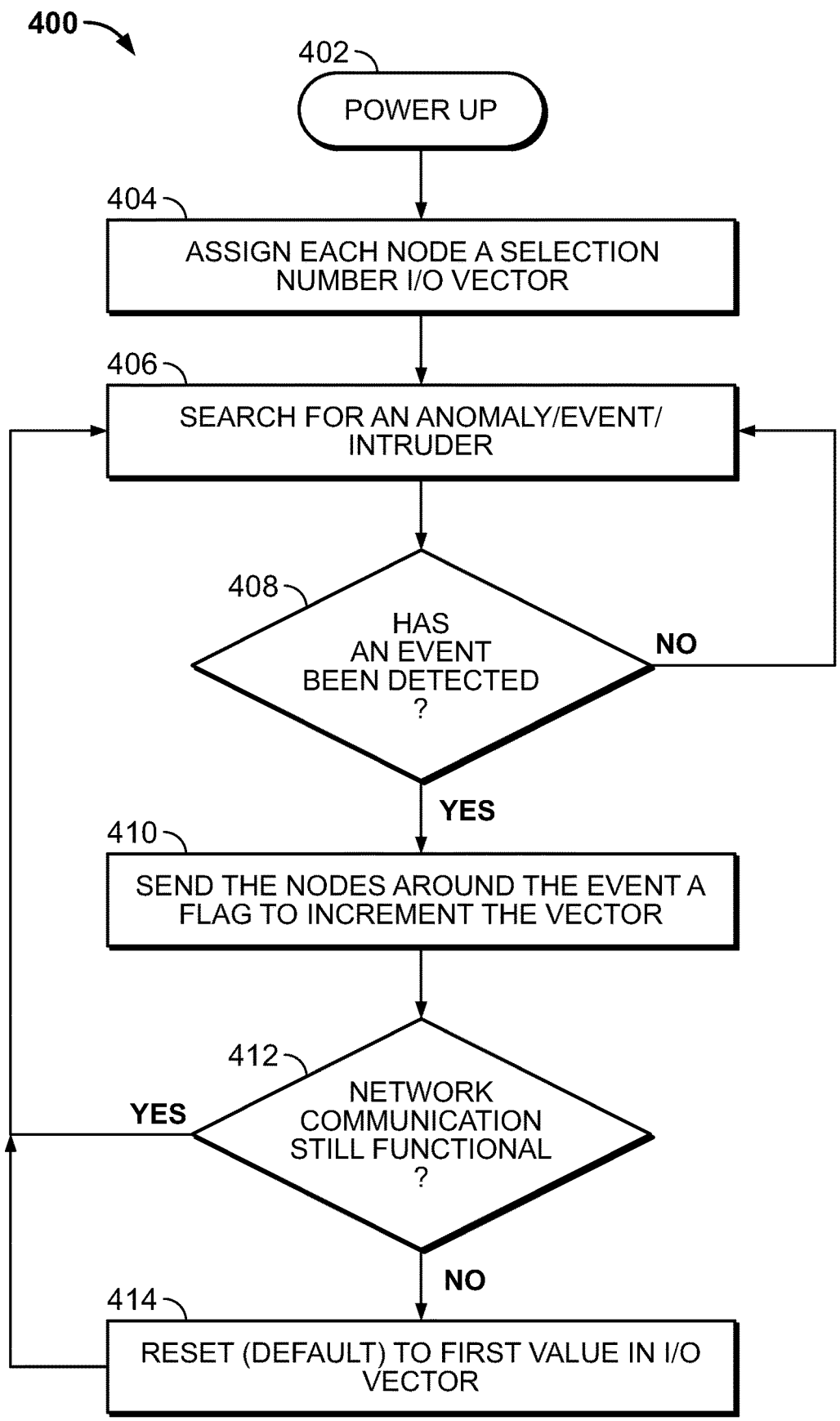
FIG. 4 is a flowchart of an example method that can be carried out by the engine control system of FIG. 3 in accordance with some embodiments.

FIG. 4 is a flowchart of an example method 400 that can be carried out by, for example, the engine control system 300 of FIG. 3. Although the methods are described with reference to illustrated flowcharts, it will be appreciated that many other ways of performing the acts associated with the methods may be used. For example, the order of some operations may be changed, and some of the operations described may be optional.

Turning to the method 400, at step 402 an engine control system is powered up. At step 404, each node, such as the control node 302 and the concentrator node 304 of FIG. 3, is assigned a position (e.g., a number) within a selection number I/O vector. The selection number I/O vector may include one or more values, where each value determines what frequency within a frequency band to communicate across. For example, the control node 302 may send a message to concentrator node 304 with a position within selection number I/O vector indicating a value that the concentrator node 304 will use to determine what frequency to use in future communications with the control node 302. At step 406, an event, such as an anomaly or intruder, is searched for. For example, control node 302 may search for an event, such as an event described above with respect to FIG. 3. At step 408, a determination is made as to whether an event has been detected. If no event has been detected, the method proceeds back to step 406. Otherwise, if an event has been detected, the method proceeds to step 410. For example, control node 302 may detect an event as described above with respect to FIG. 3.

At step 410, a flag (e.g., an indication in a message) is sent to one or more nodes to increment the position (e.g., number) they are using within the selection number I/O vector (e.g., increase the current value by 1). For example, control node 302 may send the flag to concentrator node 304. Upon receiving the flag, the concentrator node 304 will begin communicating with control node 302 at a frequency determined by the value of the new position within selection number I/O selectin vector.

At step 412, a determination is made as to whether the communications network is still functional. For example, control node 302 may determine if it can communicate with concentrator node 304 at the new frequency determined by the new selection number I/O selection vector. If communications are successful, the method proceeds back to step 406 to search for a new event. Otherwise, if communications are not successful, the method proceeds to step 414, where the nodes reset (e.g., default) to a first position in the I/O selection vector. For example, control node 302 may default to the first position of the I/O selection vector, and attempt to communicate with concentrator node 304 at the frequency determined by the first position of the I/O selection vector. Concentrator node 304 may also default to the first position in the I/O selection vector after detecting the failure of communication with control node 302.

Figure 5:
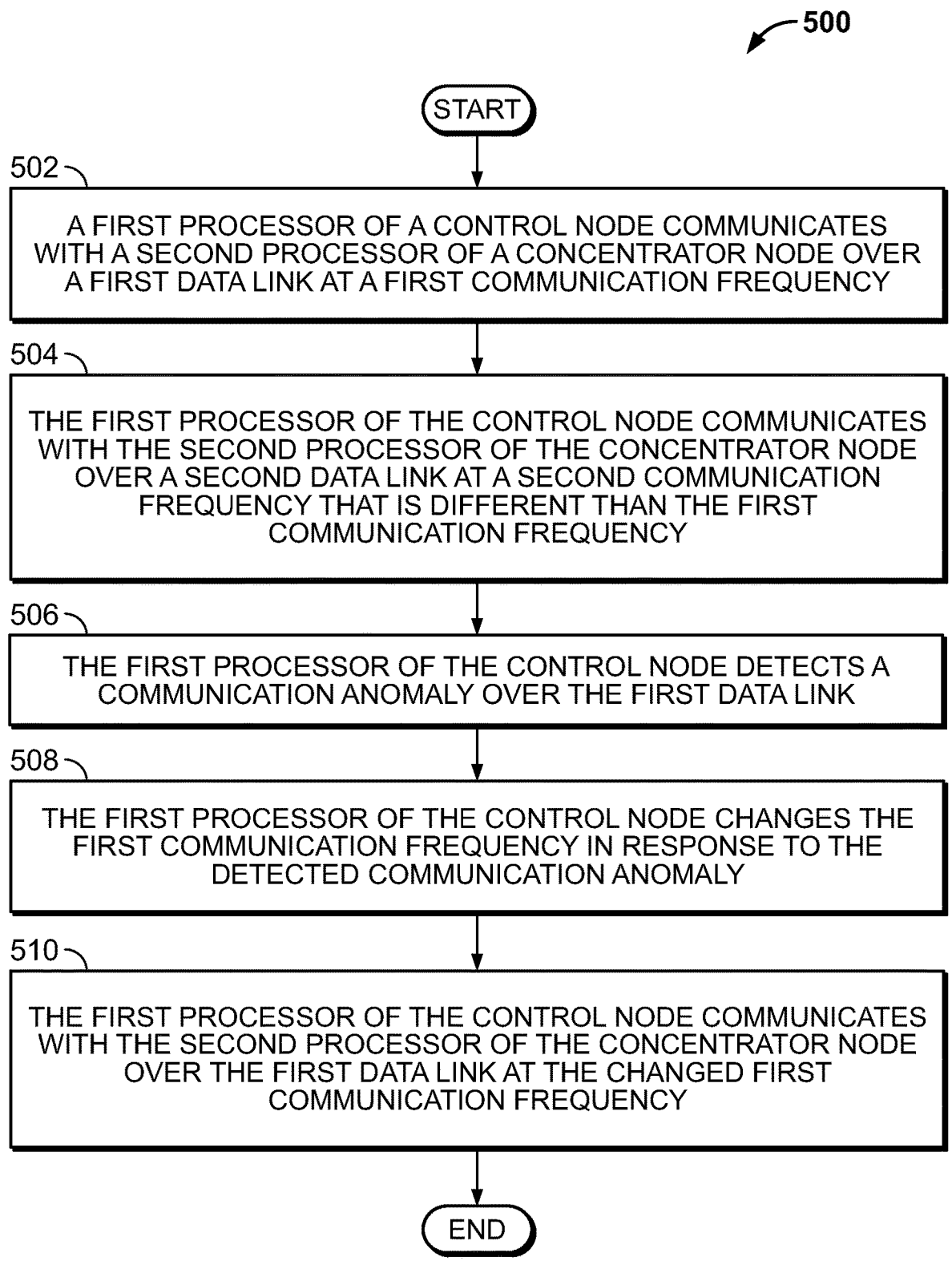
FIG. 5 is a flowchart of another example method that can be carried out by the engine control system of FIG. 3 in accordance with some embodiments.

FIG. 5 is a flowchart of another example method 500 that can be carried out by, for example, the engine control system 300 of FIG. 3. At step 502, a first processor of a control node communicates with a second processor of a concentrator node over a first data link at a first communication frequency. For example, the first processor may send one or more messages to the second processor over a fiber optic data link at a communication frequency within the UV part of the frequency spectrum. At step 504, the first processor of the control node communicates with the second processor of the concentrator node over a second data link at a second communication frequency that is different than the first communication frequency. For example, the first processor may send one or more messages to the second processor over an Ethernet link at a communication frequency within the IR part of the frequency spectrum.

At step 506, the first processor of the control node detects a communication anomaly over the first data link. At step 508, the first processor of the control node changes the first communication frequency in response to the detected communication anomaly. For example, in continuing the example from above, the first processor may change the fiber optic data link over the first communication link to a communication frequency 1 GPps. At step 510, the first processor of the control node communicates with the second processor of the concentrator node over the first data link at the changed first communication frequency.

Among other advantages, the control system and methods described herein may provide for data security and cyber security countermeasures within the control system. For example, the control system and methods allow for the use of more of the frequency spectrum for communications (e.g., data exchange). In addition, the control system and methods allow for the changing of communication frequencies and rates, as well as for data redundancy over multiple communication links that may be operating at differing communication frequencies and/or rates. Persons of ordinary skill in the art having the benefit of the disclosures herein would recognize these and other benefits as well.

Although examples are illustrated and described herein, embodiments are nevertheless not limited to the details shown, since various modifications and structural changes may be made therein by those of ordinary skill within the scope and range of equivalents of the claims.

What is claimed is:

1. A control system for an aircraft engine comprising:
a first data link;
a second data link;
a control node comprising a first processor; and
a concentrator node comprising a second processor and operably coupled to the control node via the first data link and via the second data link,
wherein the control node is configured to communicate with the concentrator node over the first data link at a first communication frequency and a first communication rate; and change the first communication frequency in response to at least one event,
wherein the control node is configured to send a frequency change indication to the concentrator node, and wherein the concentrator node is configured to communicate with the control node at the changed first communication frequency in response to receipt of the frequency change indication, and
wherein the control node is configured to change the first communication frequency periodically, and wherein the concentrator node is configured to communicate with the control node at each periodically changed first communication frequency in response to receipt of the frequency change indication.

2. The control system of claim 1 wherein the control node is configured to send the frequency change indication to the concentrator node over the second data link.

3. The control system of claim 1 wherein the control node is configured to communicate with the concentrator node over the second data link at a second communication rate that is different than the first communication rate.

4. The control system of claim 3 wherein the at least one component comprises at least one of an optical sensor, an actuator, and a smart sensor.

5. The control system of claim 1 further comprising at least one component operably coupled to the concentrator node via a third data link, wherein the concentrator node is configured to communicate with the at least one component over the third data link.

6. The control system of claim 1 wherein the at least one event comprises a detection of a cyber security threat.

7. The control system of claim 1 wherein each of the first data link and the second data link are a fiber optic link, wherein the control node is further configured to:
communicate with the concentrator node over the first data link within a first frequency range, wherein the first communication frequency is within the first frequency range; and
communicate with the concentrator node over the second data link within a second frequency range.

8. The control system of claim 1 wherein the first data link is a fiber optic link and the second data link is an Ethernet link.

9. The control system of claim 1 wherein the control node is configured to transmit first data over the first data link at the first communication rate, and transmit second data over the second data link at a second communication rate, wherein the first data and the second data are redundant.

10. An aircraft comprising:
a first data link;
a second data link;
an aircraft engine; and
an aircraft engine control system operably coupled to the aircraft engine comprising:
a control node comprising a first processor; and
a concentrator node comprising a second processor and operably coupled to the control node via the first data link and via the second data link, wherein the control node is configured to:
communicate with the concentrator node over the first data link at a first communication frequency at a first communication rate;
communicate with the concentrator node over the second data link at a second communication rate that is different than the first communication rate, wherein the control node is further configured to:
detect a cyber security threat; and
change the first communication frequency in response to a detection of the cyber security threat.

11. The aircraft of claim 10 wherein the control node is configured to send a frequency change indication to the concentrator node, and wherein the concentrator node is configured to communicate with the control node at the changed first communication frequency in response to receiving the frequency change indication.

12. The aircraft of claim 11 wherein the control node is configured to change the first communication frequency periodically, and wherein the concentrator node is configured to communicate with the control node at each periodically changed first communication frequency in response to receiving the frequency change indication.

13. The aircraft of claim 11 wherein the control node is configured to send the frequency change indication to the concentrator node over the second data link.

14. The aircraft of claim 10 wherein the aircraft engine control system further comprises at least one component operably coupled to the concentrator node via a third data link, wherein the concentrator node is configured to communicate with the at least one component over the third data link at a third communication frequency.

15. A method for controlling an aircraft engine comprising:
communicating, by a first processor of a control node, with a second processor of a concentrator node over a first data link at a first communication frequency at a first communication rate;
communicating, by the first processor of the control node, with the second processor of the concentrator node over a second data link at a second communication rate that is different than the first communication rate;
detecting, by the first processor of the control node, a communication anomaly over the first data link;
changing, by the first processor of the control node, the first communication frequency in response to the detected communication anomaly;
communicating, by the first processor of the control node, with the second processor of the concentrator node over the first data link at the changed first communication frequency;
changing, by the control node, the first communication frequency periodically; and communicating, by the concentrator node with the control node, at each periodically changed first communication frequency in response to receiving a frequency change indication.

16. The method of claim 15 further comprising:
transmitting, by the control node over the first data link at the first communication frequency, a frequency change indication to the concentrator node; and
communicating, by the concentrator node with the control node, at the changed first communication frequency in response to receiving the frequency change indication.

17. The method of claim 16 wherein the control node is configured to transmit the frequency change indication to the concentrator node over the second data link.

18. The method of claim 16 wherein the communication anomaly includes a detection of the cyber security threat.

* * * * *